US011671347B2

(12) United States Patent
Yu et al.

(10) Patent No.: US 11,671,347 B2
(45) Date of Patent: Jun. 6, 2023

(54) ON-DEMAND PACKET REDIRECTION

(71) Applicant: VMware, Inc., Palo Alto, CA (US)

(72) Inventors: Jia Yu, Sunnyvale, CA (US); Yong Wang, San Jose, CA (US); Xinhua Hong, Campbell, CA (US); Mochi Xue, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 13 days.

(21) Appl. No.: 17/038,555

(22) Filed: Sep. 30, 2020

(65) Prior Publication Data

US 2022/0103460 A1 Mar. 31, 2022

(51) Int. Cl.
*G06F 15/173* (2006.01)
*H04L 45/00* (2022.01)
*H04L 47/20* (2022.01)
*H04L 45/125* (2022.01)
*H04L 45/64* (2022.01)

(52) U.S. Cl.
CPC ............ *H04L 45/14* (2013.01); *H04L 45/125* (2013.01); *H04L 45/64* (2013.01); *H04L 45/70* (2013.01); *H04L 47/20* (2013.01)

(58) Field of Classification Search
CPC ... H04L 45/14; H04L 45/00; H04L 2012/562; H04L 2012/6443; H04L 47/19; H04L 45/125; H04L 45/64; H04L 45/70; H04L 47/20
USPC ................................ 709/223, 224, 226, 238
See application file for complete search history.

(56) References Cited

U.S. PATENT DOCUMENTS

| | | | |
|---|---|---|---|
| 10,419,357 B1 * | 9/2019 | Bhatta ..................... | H04L 69/22 |
| 2003/0014525 A1 * | 1/2003 | DeLima ................ | H04L 69/329 |
| | | | 709/227 |
| 2006/0029062 A1 * | 2/2006 | Rao ........................ | H04L 63/164 |
| | | | 370/389 |
| 2008/0276304 A1 * | 11/2008 | Maffione ............... | H04L 63/101 |
| | | | 726/4 |
| 2011/0055389 A1 * | 3/2011 | Bley ........................ | H04L 43/14 |
| | | | 709/224 |
| 2015/0263946 A1 * | 9/2015 | Tubaltsev ............... | H04L 45/02 |
| | | | 370/392 |
| 2017/0230287 A1 * | 8/2017 | Hall ......................... | H04L 69/22 |
| 2017/0237706 A1 * | 8/2017 | Wei .......................... | H04L 12/28 |
| | | | 370/392 |
| 2018/0006943 A1 * | 1/2018 | Dubey ................... | H04L 45/745 |
| 2018/0278570 A1 * | 9/2018 | Dhanabalan ........ | H04L 61/2007 |
| 2019/0052598 A1 * | 2/2019 | Hira ....................... | H04L 47/125 |
| 2021/0203738 A1 * | 7/2021 | Lin ........................ | H04L 47/2483 |

* cited by examiner

*Primary Examiner* — Kaylee J Huang
(74) *Attorney, Agent, or Firm* — Patterson + Sheridan, LLP (57) ABSTRACT

The disclosure provides an approach for performance management. Embodiments include receiving, at a port of a router, a transport control protocol (TCP) or user datagram protocol (UDP) packet generated by a performance component of the router. Embodiments include identifying, by the router, a rule related to the TCP or UDP packet. Embodiments include forwarding, by the router, the packet to an interface of a kernel based on the rule. Embodiments include receiving, by the performance component, in response to the TCP or UDP packet, an additional packet from the interface of the kernel. Embodiments include determining, by the performance component, a performance metric based on the TCP or UDP packet and the additional packet.

20 Claims, 5 Drawing Sheets

ON-DEMAND PACKET REDIRECTION

BACKGROUND

Software defined networking (SDN) comprises a plurality of hosts in communication over a physical network infrastructure, each host having one or more virtualized endpoints such as virtual machines (VMs), containers, or other virtual computing instances (VCIs) that are connected to logical overlay networks that may span multiple hosts and are decoupled from the underlying physical network infrastructure. Though certain aspects are discussed herein with respect to VMs, it should be noted that they may similarly be applicable to other suitable VCIs.

For example, any arbitrary set of VMs in a datacenter may be placed in communication across a logical Layer 2 network by connecting them to a logical switch. Each logical switch corresponds to a virtual network identifier (VNI), meaning each logical Layer 2 network can be identified by a VNI. The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain. The logical router is collectively implemented by at least one virtual router on each host or a subset of hosts. Each virtual router operates as a router implemented in software by the hypervisor on the hosts.

SDN generally involves the use of a management plane (MP) and a control plane (CP). The management plane is concerned with receiving network configuration input from an administrator or orchestration automation and generating desired state data that specifies how the logical network should be implemented in the physical infrastructure. The management plane may have access to a database application for storing the network configuration input. The control plane is concerned with determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

In some cases it may be advantageous to monitor performance within an SDN environment, such as to determine whether components and connections in the network are functioning in an acceptable manner and to take remedial action as needed. For example, performance management components may be installed at various endpoints (e.g., VMs, servers, clients, edge gateways, etc.) in a logical network in order to measure bandwidth, latency, and other metrics related to network performance. These metrics may be used for load balancing, path optimization, and the like, as well as to identify potentially malfunctioning components. In some cases, performance management components may run within VMs, and may generate traffic for the purpose of measuring various metrics. However, while these techniques may be useful for performance management within a logical network, existing techniques may not allow for performance management between separate logical networks for particular reasons. For example, many performance management tools utilize transport control protocol (TCP) and/or user datagram protocol (UDP) traffic in order to measure performance metrics. A performance management component generally runs in user space rather than within the kernel of an operating system (OS), and so does not have access to a TCP and/or UDP stack of the kernel. As such, TCP/UDP traffic generated by a performance management component in user space at an edge node of a logical network may be dropped without being forwarded to its intended endpoint outside of the logical network.

Accordingly, there is a need in the art for improved techniques for performance management between logical networks.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for performance management across logical networks through on-demand packet redirection. In particular, techniques described herein involve the use of rules to forward traffic from a performance management component running in user space of an edge node of a logical network to a kernel of an operating system of the edge node. It should be noted that certain techniques for packet redirection from a user space to a kernel of an operating system are discussed with respect to use for performance management in an edge node. However, such techniques may also be applicable to other nodes and/or for other purposes.

For example, a performance management system may involve multiple performance management components that run in different endpoints (e.g., VMs) in a networking environment and exchange traffic for the purpose of monitoring performance metrics such as bandwidth and latency between the endpoints. In order to monitor performance between two different logical networks, performance management components may be included in edge nodes of both logical networks. An edge node generally refers to a gateway of a given logical network that provides connectivity between nodes in the given logical network and endpoints outside of the given logical network, such as gateways of other logical networks. A performance management component generally runs as an application in user space. In some embodiments, a performance management component running in user space on an edge node may generate transport control protocol (TCP) and/or user datagram protocol (UDP) traffic. However, there may be no mechanism in user space to handle forwarding of this traffic, such as a TCP/IP stack. For example, the TCP/IP stack may be in the kernel of the OS running on the edge node. As such, without techniques described herein, the traffic generated by the performance management component at the edge node may be dropped without being sent to its destination.

According to certain embodiments, one or more rules are defined that cause traffic generated by the performance management component to be forwarded to the kernel for processing. The rules may be defined via the management plane, such as by an administrator. For example, a rule may indicate that all TCP and/or UDP traffic received at an uplink port of a logical router, implemented by a virtual router on the edge node, is to be forwarded to an interface associated with the kernel of the operating system running on the edge node. The interface may be, for example, a kernel network interface controller (NIC) interface (KNI). The interface may allow packets to be forwarded from user space to the kernel, where they can be processed using a TCP/IP stack of the kernel and passed to a NIC (which may be either a physical or virtual NIC) of the edge node for forwarding to intended destinations (e.g., outside of the logical network). Incoming TCP and/or UDP traffic received at the edge node from outside sources may be received by the NIC and then sent via the KNI to the performance management component.

Thus, the performance management component in the edge node may utilize the traffic that it sends to outside endpoints and the traffic it receives from the outside endpoints to determine performance metrics between the gateway and the outside endpoints. For example, bandwidth and latency between two different logical networks may be determined, and may be used for various purposes, such as load balancing, path optimization, and the like. For instance, the performance metrics may be used to determine whether a bottleneck is between uplink ports within an underlay network or in a VPN tunnel, and this information may be used to better address a cause of the bottleneck.

For load balancing and path optimization, performance metrics determined using techniques described herein may be used to better identify targets for workload deployment and/or traffic routing. For example, determining whether a high amount of latency exists in the path between two VMs in a first logical network or, instead, in the path between the first logical network and a second logical network may allow for better determinations of where to route packets or place workloads for optimal performance.

Existing techniques do not allow for running these types of performance management components in logical router ports of edge nodes, as there is not generally a TCP/IP stack in user space. As such, embodiments of the present disclosure improve existing techniques by allowing performance management components to be utilized in edge nodes for managing performance across multiple logical networks.

Techniques for forwarding traffic between endpoints in logical networks via logical routers and logical switches are described in more detail in U.S. Pat. No. 9,787,605, the contents of which are incorporated herein by reference in their entirety.

Figure 1:
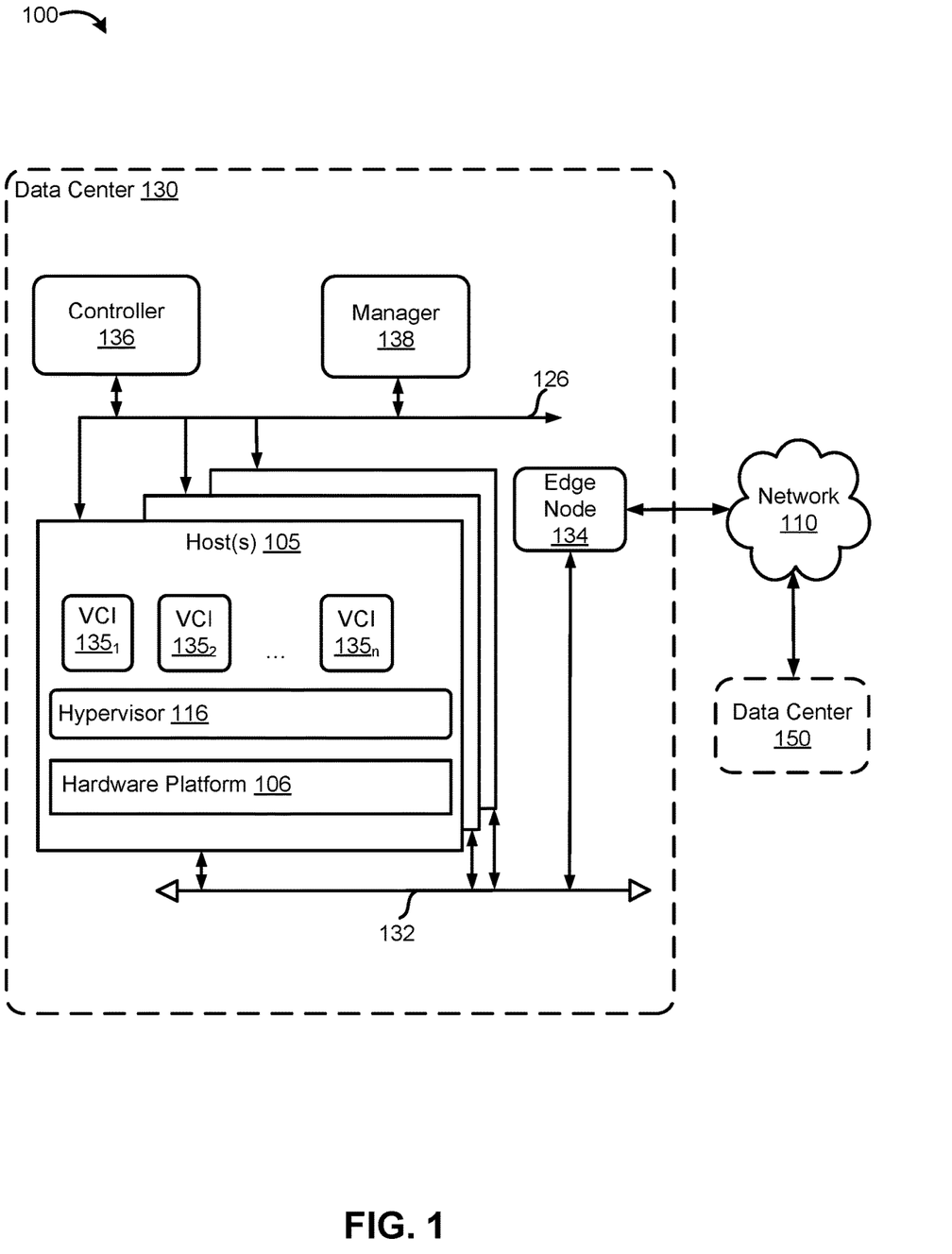
FIG. 1 depicts example physical and virtual network components with which embodiments of the present disclosure may be implemented.

FIG. 1 depicts example physical and virtual network components with which embodiments of the present disclosure may be implemented.

Networking environment 100 includes data centers 130 and 150 connected to network 110. Network 110 is generally representative of a network of computing entities such as a local area network ("LAN") or a wide area network ("WAN"), a network of networks, such as the Internet, or any connection over which data may be transmitted.

Data centers 130 and 150 each generally represent a set of networked computing entities, and may comprise a logical overlay network. Data center 130 includes host(s) 105, a gateway 134, a data network 132, which may be a Layer 3 network, and a management network 126. Data network 132 and management network 126 may be separate physical networks or different virtual local area networks (VLANs) on the same physical network. Data center 150 may comprise similar elements to those depicted in data center 130.

Each of hosts 105 may be constructed on a server grade hardware platform 106, such as an x86 architecture platform. For example, hosts 105 may be geographically co-located servers on the same rack or on different racks. Host 105 is configured to provide a virtualization layer, also referred to as a hypervisor 116, that abstracts processor, memory, storage, and networking resources of hardware platform 106 into multiple virtual computing instances (VCIs) $135_1$ to $135_n$ (collectively referred to as VCIs 135 and individually referred to as VCI 135) that run concurrently on the same host. VCIs 135 may include, for instance, VMs, containers, virtual appliances, and/or the like.

Hypervisor 116 may run in conjunction with an operating system (not shown) in host 105. In some embodiments, hypervisor 116 can be installed as system level software directly on hardware platform 106 of host 105 (often referred to as "bare metal" installation) and be conceptually interposed between the physical hardware and the guest operating systems executing in the virtual machines. In certain aspects, hypervisor 116 implements one or more logical entities, such as logical switches, routers, etc. as one or more virtual entities such as virtual switches, routers, etc. In some implementations, hypervisor 116 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine. Although aspects of the disclosure are described with reference to VMs, the teachings herein also apply to other types of virtual computing instances (VCIs) or data compute nodes (DCNs), such as containers, which may be referred to as Docker containers, isolated user space instances, namespace containers, etc. In certain embodiments, VCIs 135 may be replaced with containers that run on host 105 without the use of a hypervisor.

Edge node (e.g., gateway) 134 provides VCIs 135 and other components in data center 130 with connectivity to network 110, and is used to communicate with destinations external to data center 130 (not shown). Edge node 134 may be implemented as one or more VCIs, physical devices, and/or software modules running within one or more hosts 105. As described in more detail below with respect to FIGS. 2-5, edge node 134 may comprise a virtual router implementing a logical router that provides connectivity via a NIC (e.g., within hardware platform 106) between data center 130 and external endpoints, such as components running within data center 150. A performance management component may run within edge node 134, and may generate and receive traffic for use in determining performance metrics between edge node 134 and external endpoints. For example, one or more rules may cause TCP and/or UDP traffic generated by the performance management component to be forwarded to a KNI of edge node 134 so that the traffic may be processed within a kernel of edge node 134.

Controller 136 generally represents a control plane that manages configuration of VCIs 135 within data center 130. Controller 136 may be a computer program that resides and executes in a central server in data center 130 or, alternatively, controller 136 may run as a virtual appliance (e.g., a VM) in one of hosts 105. Although shown as a single unit, it should be understood that controller 136 may be implemented as a distributed or clustered system. That is, controller 136 may include multiple servers or virtual computing instances that implement controller functions. Controller 136 is associated with one or more virtual and/or physical CPUs (not shown). Processor(s) resources allotted or assigned to controller 136 may be unique to controller 136, or may be shared with other components of data center 130. Controller 136 communicates with hosts 105 via management network 126.

Manager 138 represents a management plane comprising one or more computing devices responsible for receiving logical network configuration inputs, such as from a network administrator, defining one or more endpoints (e.g., VCIs and/or containers) and the connections between the endpoints, as well as rules governing communications between various endpoints. In one embodiment, manager 138 is a computer program that executes in a central server in networking environment 100, or alternatively, manager 138 may run in a VM, e.g. in one of hosts 105. Manager 138 is configured to receive inputs from an administrator or other entity, e.g., via a web interface or API, and carry out administrative tasks for data center 130, including centralized network management and providing an aggregated system view for a user. According to embodiments of the present disclosure, manger 138 allows for the creation of rules that cause traffic generated by a performance management component in edge node 134 to be forwarded to a kernel of edge node 134 via an interface, such as a KNI, as described in more detail below.

Figure 2:
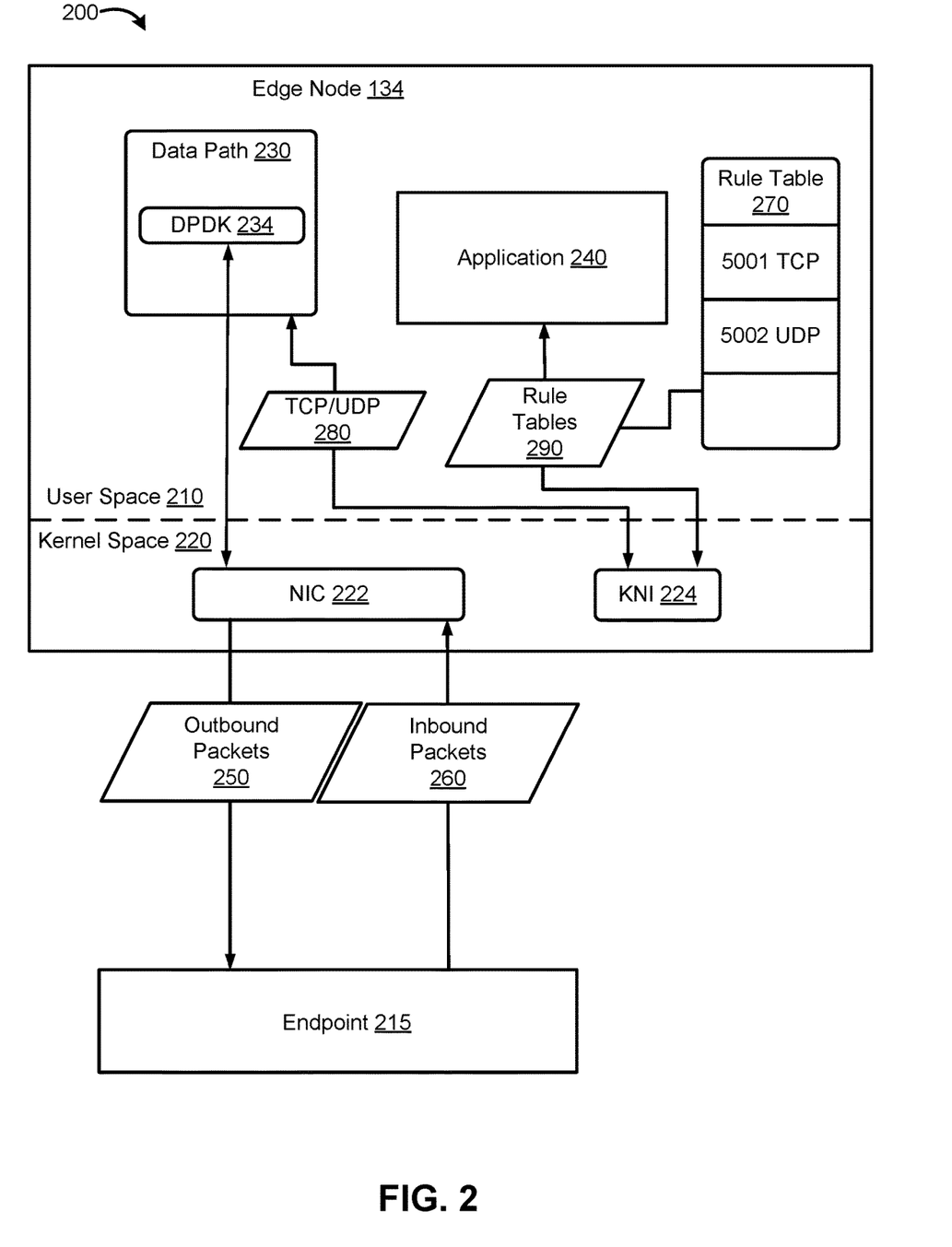
FIG. 2 depicts an example of on-demand packet redirection for performance management according to embodiments of the present disclosure.

FIG. 2 is an illustration 200 of on-demand packet redirection for performance management according to embodiments of the present disclosure. Illustration 200 depicts aspects of edge node 134 of FIG. 1.

Edge node 134 includes user space 210, which generally represents a portion of system memory where applications run in user mode, meaning that they may have restricted privileges and may not be able to access certain operating system level functionality. Edge node 134 further includes kernel space, which generally represents a portion of system memory where the kernel of the operating system runs and provides its services, and users (e.g., other than administrators) are not generally able to access the kernel space.

Data path 230 in user space 210 generally represents one or more modules (e.g., protocol stacks, drivers, and the like) that perform data processing operations for traffic related to applications in user space 210, such as application 240. Data path 230 includes a data plane development kit (DPDK) 234, which generally provides applications utilizing data path 230 with high-performance packet processing libraries and user-space drivers.

An application 240 runs in user space 210. Application 240 may, for example, be a performance management component that generates traffic for use in determining performance metrics between edge node 134 and endpoints external to a logical network of edge node 134, such as endpoint 215. In one example, endpoint 215 is a gateway in data center 150 of FIG. 1. Rule tables 290 generally indicate how packets are to be forwarded, and may include rule table 270. Rule table 290 may be used to decide if a particular flow (e.g., based on any 5-tuple, or a combination of them) should be forwarded to the kernel or not For example, rule tables 290 may indicate that all TCP and/or UDP traffic generated by application 240 within data path 230 is to be forwarded from data path 230 to KNI 224 (e.g., by code in the data path 230 of edge node 134). Similarly, rule tables 290 may indicate that all TCP and/or UDP traffic received by edge node 134, via NIC 222, from external endpoints is to be forwarded to application 240 via data path 230 (e.g., via one or more protocol stacks in data path 230). For instance, as shown in rule table 270, TCP traffic may be routed to port 5001 and UDP traffic may be routed to port 5002 (e.g., which may be ports associated with KNI 224 that KNI 224 listens on). In some embodiments, rule tables 290 are configured by an administrator via manager 138 of FIG. 1

Traffic forwarded to KNI 224 from data path 230 may be processed using a TCP/IP stack and transmitted as outbound packets 250 via NIC 222 to endpoints such as endpoint 215. Likewise traffic received from endpoints such as endpoint 215 may be received by edge node 134 as inbound packets 260.

Kernel space 220 includes a NIC 222 and KNI 224. KNI 224 represents an interface between NIC 222 and user space 210. It is noted that a KNI is included as an example, and any suitable interface between kernel space 220 and user space 210 may be utilized with embodiments of the present disclosure. NIC 222 may be either a virtual NIC (VNIC) or a physical NIC (PNIC).

Figure 3:
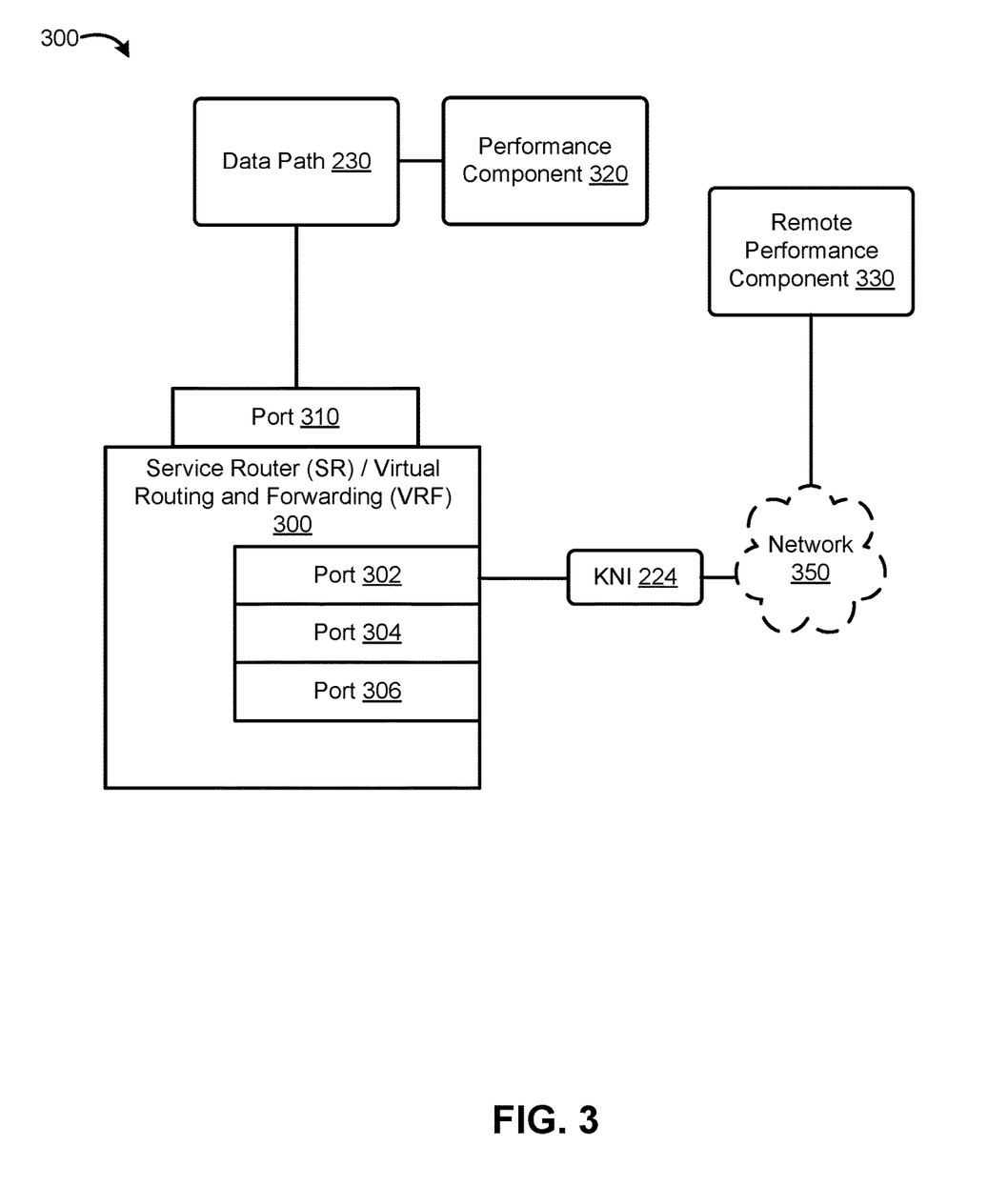
FIG. 3 depicts another example of on-demand packet redirection for performance management according to embodiments of the present disclosure.

FIG. 3 is another illustration 300 of on-demand packet redirection for performance management according to embodiments of the present disclosure. Illustration 300 includes data path 230 and KNI 224 of FIG. 2.

Performance component 320, which may be representative of application 240 of FIG. 2, generates traffic that is forwarded to data path 230, and is received by port 310 of a service router (SR) 300 that implements virtual routing and forwarding (VRF) functionality. Port 310 may be an uplink or a downlink port. VRF generally allows multiple instances of a routing table to exist in a single router, such as a virtual router implementing a logical router at a host, and to be used simultaneously. A host may implement multiple logical switches, each associated with a different VNI, as multiple virtual switches. SR 300 may serve as a generic logical router for edge node 134 that receives all incoming packets and routes them to an appropriate virtual switch.

As described in more detail below with respect to FIG. 4, SR 300 may implement part of a logical router of an edge node, such as edge node 134. SR 300 includes ports 302, 304, and 306. In one example, port 302 is a central processing unit (CPU) port (e.g., a port assigned by a CPU for connecting to KNI 224), port 304 is a virtual tunnel interface (VTI) port (e.g., a port that connects to a VTI tunnel), and port 306 is a loopback port (e.g., a port that connects back to SR 300).

A rule may indicate that TCP and/or UDP traffic, as identified by a protocol number of a packet, received at uplink port 310 is to be forwarded via port 302 to KNI 224. Thus, TCP and/or UDP traffic is processed in the kernel and forwarded to a remote performance component 330, such as in a gateway of a different logical network. In some embodiments, remote performance component 330 is accessed via a network 350. For example, remote performance component 330 can be across the internet, in another data center, on the same logical network, or the like.

Performance component 320 and remote performance component 330 may be a client/server performance management system whereby traffic is generated between two different logical networks in order to determine performance metrics. For example, performance management component 320 may be a client and remote performance component 330 may be a server, or vice versa.

Figure 4:
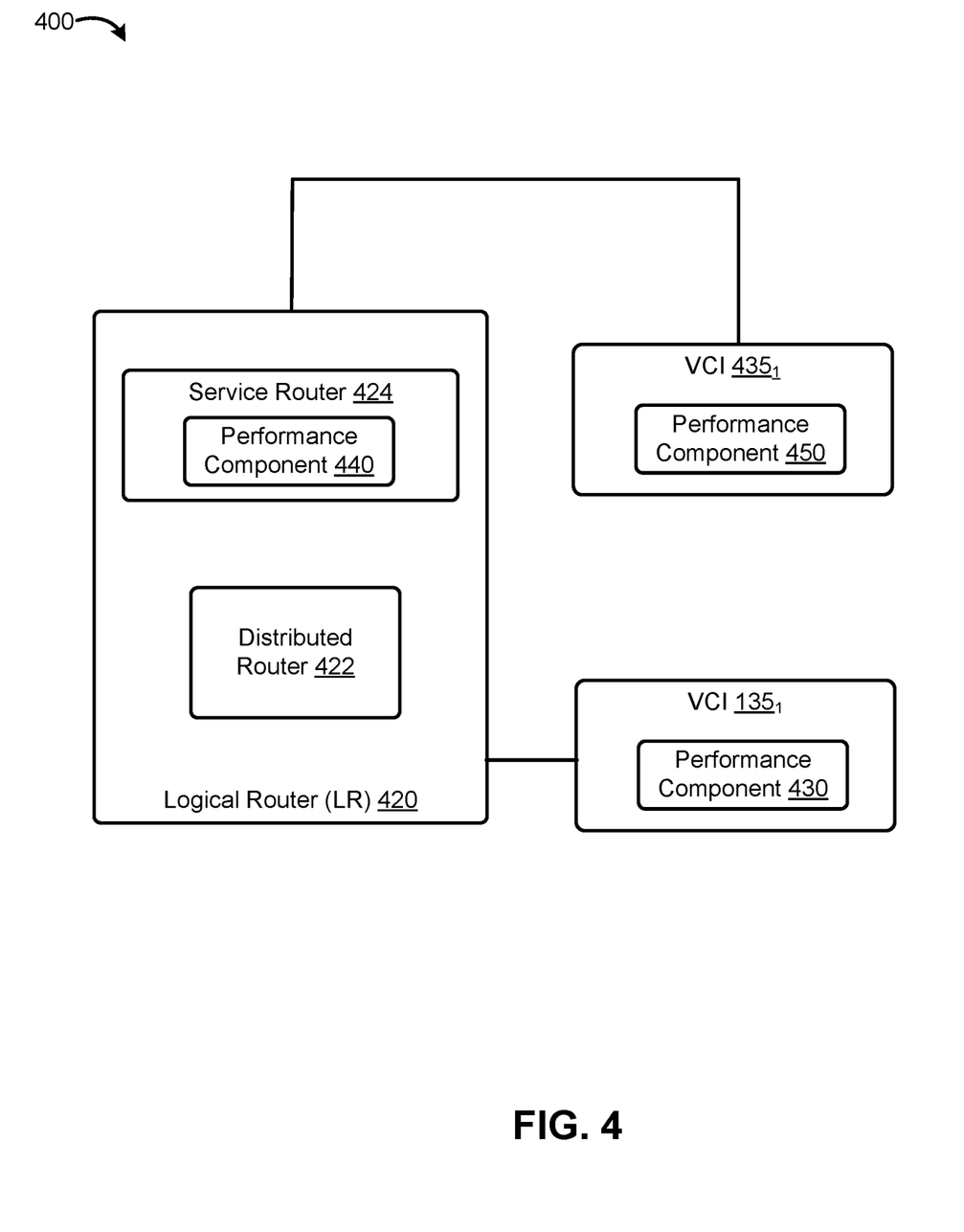
FIG. 4 depicts another example of on-demand packet redirection for performance management according to embodiments of the present disclosure.

FIG. 4 is an illustration 400 of on-demand packet redirection for performance management, according to embodiments of the present disclosure. Illustration 400 includes VCI 135$_1$ of FIG. 1 and another VCI 435$_1$. For example, VCI 135$_1$ may be in a first logical network and VCI 435$_1$ may be in a second logical network. VCI 135$_1$ is connected to a logical router (LR) 420, which comprises a distributed router 422 and a service router 424.

LR 420 may be a configured partition of a traditional network hardware router that replicates the hardware's functionality, creating multiple routing domains within a single router. Logical routers generally perform a subset of the tasks that can be handled by a physical router, and each can contain multiple routing instances and routing tables. A logical router generally consists of two optional parts: a distributed router (DR) and one or more service routers (SR). A DR spans and is implemented as virtual routers on hypervisors whose VCIs are connected to this logical router, as well as edge nodes the logical router is bound to, and is responsible for one-hop distributed routing between logical switches and/or logical routers connected to this logical router. An SR is implemented on the hypervisors and is responsible for delivering services that may not be implemented in a distributed fashion, such as stateful network address translation (NAT).

Performance components 430 and 450 are located in VCIs 135$_1$ and 435$_1$. Performance component 440 is located in service router 424. Without a performance component in service router 424, it would be difficult to pinpoint the source of performance issues between the logical networks, because it would not be clear if latency between VCIs 135$_1$ and 435$_1$, for example, was attributable to connections within one of the logical networks or the connection between the two logical networks. The ability to run performance components in edge nodes of the logical networks, as described herein, allows for a more holistic understanding of where potential bottlenecks may exist, thereby allowing sources of problems to be more effectively identified and addressed.

Packet redirection within service router 424 may be accomplished, for example, by a workflow described by the following pseudocode:

1) user or solutions log in to Edge root shell, enter LR VRF
2) tell datapathd the iperf server port number, and protocol type (TCP/UDP)

edge-appctl -t /var/run/vmware/edge/dpd.ctl lrouter_port/set_redirect <routable port UUID> proto <TCP/UDP> [src <port>|dst <port>]

3) launch iperf server or client with specified proto and server port number. For example:
iperf -s -u -p 5800 (server side)
iperf -c <server_ip> -u -p 5800 (client side)

4) after iperf finish, delete redirect rule
edge-appctl -t /var/run/vmware/edge/dpd.ctl lrouter_port/del_redirect <routable port UUID> proto <TCP/UDP> [src <port>|dst <port>]

It is possible to set a static port number, or on-demand port number using this approach.

In the data path, upon receiving a set_redirect CLI, the data path will find a VRF identifier based on a logical router port UUID, and do a route lookup to check that a route exists for a CPU/loopback port. If a route exists, the data path may insert the port number into a redirection table. The data path may further implement a hash table to store a redirection port number. Furthermore code may be added in local deliver to check the redirection table.

Figure 5:
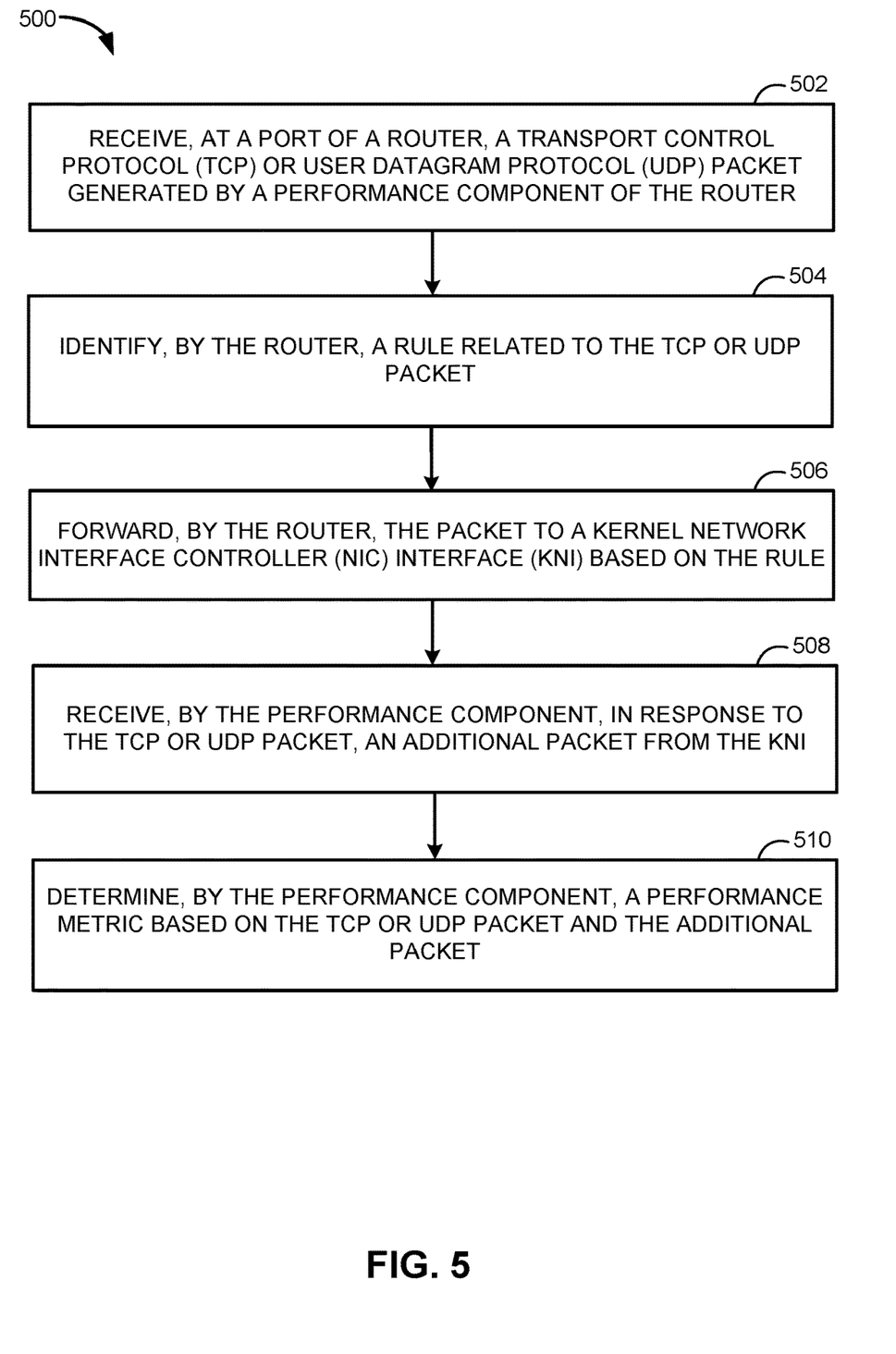
FIG. 5 depicts example operations for dynamic compliance management according to embodiments of the present disclosure.

FIG. 5 depicts example operations 500 for on-demand packet redirection for performance management, according to embodiments of the present disclosure. For example, operations 500 may be performed by one or more components of edge node 134 of FIG. 1.

At 502, a TCP or UDP packet that was generated by a performance component of a router is received at a port of the router.

At 504, a rule related to the TCP or UDP packet is identified by the router.

At 506, the router forwards the packet to a KNI bases on the rule.

At 508, the performance component receives an additional packet from the KNI. The additional packet may, for instance, be a response to the TCP or UDP packet indicating data related to the receipt or lack of receipt of the TCP or UDP packet by an endpoint.

At 510, the performance component determines a performance metric based on the TCP or UDP packet and the additional packet. For example, the performance metric may be bandwidth or latency, and may be determined based on how quickly the TCP or UDP packet was received by the endpoint as indicated in the additional packet.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and/or the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of performance management, comprising:
receiving, at a port of a router that is implemented by a virtual router on an edge node of a logical network, a transport control protocol (TCP) or user datagram protocol (UDP) packet generated by a performance component of the router, wherein the performance component runs in a user space of an operating system (OS) running on the edge node;
identifying, by the router, a rule related to the TCP or UDP packet, wherein the rule causes all TCP or UDP traffic received at the port of the router from the performance component of the router to be forwarded to an interface component of a kernel of the OS, wherein the interface component is an interface between the user space of the OS and a network interface associated with the kernel;
forwarding, by the router, the packet to the interface component of the kernel based on the rule;
receiving, by the performance component, in response to the TCP or UDP packet, an additional packet from the interface component of the kernel; and
determining, by the performance component, a performance metric based on the TCP or UDP packet and the additional packet.

2. The method of claim 1, wherein identifying, by the router, the rule related to the TCP or UDP packet comprises determining that a forwarding rule related to the TCP or UDP packet has been defined via a management component.

3. The method of claim 1, wherein the additional packet comprises data related to a receipt or a lack of receipt of the TCP or UDP packet by an endpoint.

4. The method of claim 3, wherein the performance metric comprises bandwidth or latency.

5. The method of claim 1, further comprising performing, based on the performance metric, one or more of:
   load balancing; or
   path optimization.

6. The method of claim 1, wherein the TCP or UDP packet comprises a destination address that is outside of a logical network in which the router is located.

7. The method of claim 6, wherein the destination address corresponds to an edge node of a separate logical network.

8. A non-transitory computer-readable medium comprising instructions that, when executed by one or more processors of a computer system, cause the computer system to perform a method of performance management, the method comprising:
   receiving, at a port of a router that is implemented by a virtual router on an edge node of a logical network, a transport control protocol (TCP) or user datagram protocol (UDP) packet generated by a performance component of the router, wherein the performance component runs in a user space of an operating system (OS) running on the edge node;
   identifying, by the router, a rule related to the TCP or UDP packet, wherein the rule causes all TCP or UDP traffic received at the port of the router from the performance component of the router to be forwarded to an interface component of a kernel of the OS, wherein the interface component is an interface between the user space of the OS and a network interface associated with the kernel;
   forwarding, by the router, the packet to the interface component of the kernel based on the rule;
   receiving, by the performance component, in response to the TCP or UDP packet, an additional packet from the interface component of the kernel; and
   determining, by the performance component, a performance metric based on the TCP or UDP packet and the additional packet.

9. The non-transitory computer-readable medium of claim 8, wherein identifying, by the router, the rule related to the TCP or UDP packet comprises determining that a forwarding rule related to the TCP or UDP packet has been defined via a management component.

10. The non-transitory computer-readable medium of claim 8, wherein the additional packet comprises data related to a receipt or a lack of receipt of the TCP or UDP packet by an endpoint.

11. The non-transitory computer-readable medium of claim 10, wherein the performance metric comprises bandwidth or latency.

12. The non-transitory computer-readable medium of claim 8, wherein the method further comprises performing, based on the performance metric, one or more of:
   load balancing; or
   path optimization.

13. The non-transitory computer-readable medium of claim 8, wherein the TCP or UDP packet comprises a destination address that is outside of a logical network in which the router is located.

14. The non-transitory computer-readable medium of claim 13, wherein the destination address corresponds to an edge node of a separate logical network.

15. A system, comprising one or more processors and a non-transitory computer-readable medium comprising instructions that, when executed by the one or more processors, cause the system to perform a method of performance management, the method comprising:
   receiving, at a port of a router that is implemented by a virtual router on an edge node of a logical network, a transport control protocol (TCP) or user datagram protocol (UDP) packet generated by a performance component of the router, wherein the performance component runs in a user space of an operating system (OS) running on the edge node;
   identifying, by the router, a rule related to the TCP or UDP packet, wherein the rule causes all TCP or UDP traffic received at the port of the router from the performance component of the router to be forwarded to an interface component of a kernel of the OS, wherein the interface component is an interface between the user space of the OS and a network interface associated with the kernel;
   forwarding, by the router, the packet to the interface component of the kernel based on the rule;
   receiving, by the performance component, in response to the TCP or UDP packet, an additional packet from the interface component of the kernel; and
   determining, by the performance component, a performance metric based on the TCP or UDP packet and the additional packet.

16. The system of claim 15, wherein identifying, by the router, the rule related to the TCP or UDP packet comprises determining that a forwarding rule related to the TCP or UDP packet has been defined via a management component.

17. The system of claim 15, wherein the additional packet comprises data related to a receipt or a lack of receipt of the TCP or UDP packet by an endpoint.

18. The system of claim 17, wherein the performance metric comprises bandwidth or latency.

19. The system of claim 15, wherein the method further comprises performing, based on the performance metric, one or more of:
   load balancing; or
   path optimization.

20. The system of claim 15, wherein the TCP or UDP packet comprises a destination address that is outside of a logical network in which the router is located.

* * * * *